United States Patent [19]

Alexander

[11] Patent Number: 5,085,483
[45] Date of Patent: Feb. 4, 1992

[54] CONVERTIBLE TOP LATCHING MECHANISM

[75] Inventor: Michael Alexander, Grosse Ile, Mich.

[73] Assignee: ASC Incorporated, Southgate, Mich.

[21] Appl. No.: 678,756

[22] Filed: Apr. 1, 1991

Related U.S. Application Data

[63] Continuation of Ser. No. 438,744, Nov. 18, 1989, abandoned.

[51] Int. Cl.⁵ .............................. E05C 9/16; B60J 7/10
[52] U.S. Cl. ....................................... 296/121; 292/36; 292/DIG. 5
[58] Field of Search ....................... 292/36, DIG. 5, 7; 296/120.1, 121, 224

[56] References Cited

U.S. PATENT DOCUMENTS

| Re. 23,007 | 6/1948 | Vigmostad et al. | 292/DIG. 5 X |
|---|---|---|---|
| 1,929,371 | 10/1933 | Hamilton | 292/7 |
| 1,964,114 | 6/1934 | Gerlach et al. | 292/36 |
| 2,570,260 | 10/1951 | Milhan | 296/120.1 X |
| 2,586,648 | 2/1952 | Hale et al. | 292/DIG. 5 X |
| 2,831,718 | 4/1958 | Hallek et al. | 292/DIG. 5 X |
| 3,135,541 | 6/1964 | Kwasek | 292/DIG. 5 X |
| 3,400,562 | 9/1968 | Bloss | 292/36 X |
| 3,425,742 | 2/1969 | Rauber, Jr. | 296/121 |
| 4,223,943 | 9/1980 | Van Hulle et al. | 292/DIG. 5 X |

FOREIGN PATENT DOCUMENTS 2353721  4/1975  Fed. Rep. of Germany ........ 292/36

Primary Examiner—Lloyd A. Gall
Attorney, Agent, or Firm—Harness, Dickey & Pierce

[57] ABSTRACT

A latching mechanism for use with a convertible-type vehicle is disclosed, in which a handle is pivotally rotatable about a fixed pivot pin, the handle being connected to a transfer arm which moves a retaining member out of engagement with a latch pin when the handle is pivotally rotated about the pin to disengage the convertible top from the vehicle.

12 Claims, 3 Drawing Sheets

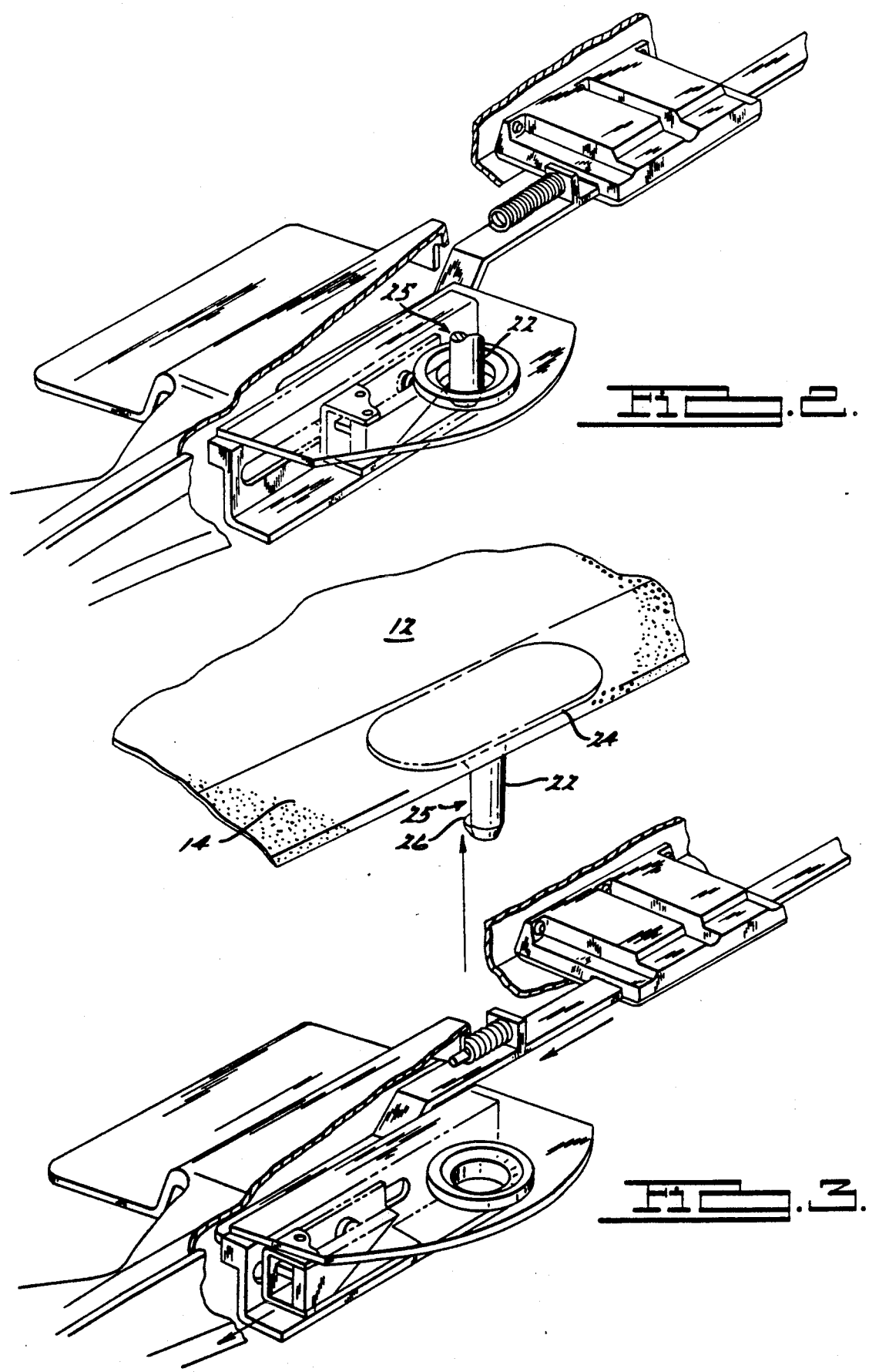

CONVERTIBLE TOP LATCHING MECHANISM

This is a continuation of U.S. patent application Ser. No. 438,744, filed Nov. 18, 1989, now abandoned.

BACKGROUND OF THE INVENTION

1. Field of the Invention

The present invention relates to automotive latching mechanisms. More particularly, the present invention relates to a latching mechanism suitable for use with a convertible-type vehicle. Even more particularly, the present invention concerns a latching mechanism for latching a convertible top to a stationary structure of the vehicle.

2. Prior Art

Due to the continuing popularity of convertible-type vehicles, a need exists for reliable, simple to manufacture, and easy to use latching mechanisms for removably attaching a convertible top to the windshield header of a convertible-type vehicle. Furthermore, since such a release mechanism may be operated by people having limited strength, such as, e.g., women, children, or older people, it would be advantageous to make the release mechanism easy to operate without great exertion, yet secure enough to retain the sections in engagement during normal operation of the vehicle to which it is attached. While the art has taught numerous latching mechanisms, most are too difficult for these types of persons to operate.

For example, U.S. Pat. No. 4,702,505, issued to Alexander, discloses a latching mechanism for a convertible-type vehicle including a two-component, positionally adjustable, assembly which is mounted to the vehicle and includes a screw type projection which is received in a keeper disposed proximate the windshield header of the vehicle. A handle is permanently fixed to the projection to facilitate rotation thereof into and out of the keeper for the latching and unlatching, as desired. However, the handle in this prior art patent is not so easily rotated as to accommodate older persons and the like. The present invention, as will subsequently be detailed, overcomes this problem in the prior art.

SUMMARY OF THE INVENTION

A latching mechanism in accordance with the present invention is intended for use in a vehicle of the type having a movable section mountable to a stationary structure of the vehicle, for releasbly latching the movable section to the stationary structure of the vehicle. The latching mechanism hereof, generally, comprises:

(a) a first pin member comprising a latch pin having a cutaway section formed therein and with a lip extending outwardly below the cutaway section, the first pin member being mountable on a movable section of a vehicle; and (b) a keeper assembly for mounting on a stationary part of a vehicle to retentively and disengagably receive the latch pin, the keeper assembly comprising:

(1) a first receiving plate having a hole therethrough which receives the latch pin;

(2) a first transfer arm mounted adjacent the first receiving plate and supported for slidable movement thereof with respect to the first receiving plate;

(3) a first retaining member disposed beneath the first receiving plate and operatively connected to the first transfer arm, the first retaining member being engagable in the cutaway section of the latch pin to releasably retain the latch pin in engagement therewith;

(4) a pivot pin attachable to a stationary section of a vehicle; and (5) a handle which is pivotally rotatable on the pivot pin, the handle being operatively connected to the first transfer arm for causing slidable movement of the transfer arm when the handle is pivotally rotated about the pivot pin.

The present invention further provides a latching mechanism for attaching a movable section of a vehicle, such as a header bow of a convertible top, to a stationary structure of a vehicle, such as a windshield header. Other suitable uses for the mechanism of the present invention will be apparent to one skilled in the art. The mechanism of the present invention is actuated by the handle which pivots about the pivot pin and is operatively connected to the transfer arm to slidably move the transfer arm in a direction away from the pivot pin when the handle is rotated in a first direction. This outward movement of the transfer arm moves a retaining member out of the cutaway section in the latch pin, the latch pin being attached to the header bow of a convertible top assembly. When the retaining member slides out of the latch pin, the convertible top assembly may be released from its attachment to the windshield header for lowering of the convertible top assembly.

Further detail regarding the present invention may be found in the detailed description section, and for a more complete understanding of the present invention, reference is made to the detailed description and accompanying drawing. Throughout the following description and in the drawings, identical reference numbers are used to refer to the same component shown in multiple figures of the drawings, in which:

BRIEF DESCRIPTION OF THE DRAWINGS

FIG. 2 is a perspective view of a portion of the latching mechanism of FIG. 1, partially in cutaway, and partially in phantom, showing the mechanism in a latched position;

FIG. 3 is a perspective view similar to FIG. 2, but showing, additionally, a portion of the convertible top with the pin member mounted thereon, and showing the orientation of the components of the mechanism in an unlatched position;

DETAILED DESCRIPTION OF THE PREFERRED EMBODIMENT

Figure 1:
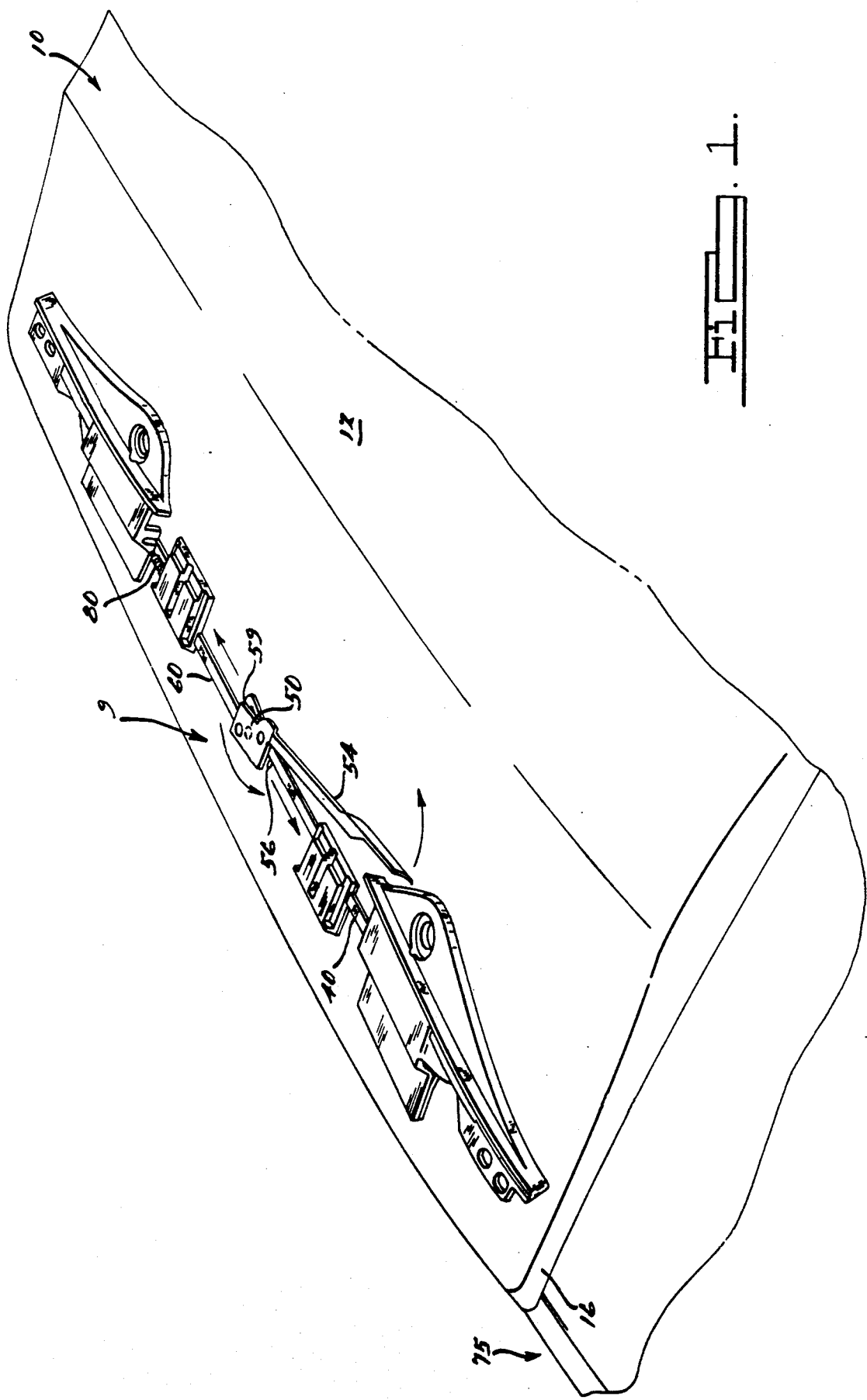
FIG. 1 is a perspective view of the keeper assembly of a first embodiment of a latching mechanism in accordance with the present invention, shown in a windshield header of a convertible-type vehicle, with a convertible top shown in phantom.

Referring to FIGS. 1-4 of the drawings, the latching mechanism of a first embodiment of the present invention is shown generally at 20. The latching mechanism 20 of the present invention is suitable for latching a movable section of a vehicle to a stationary structure thereof, and is particularly suitable for use with a convertible-type vehicle 10, the vehicle 10 having a foldable roof assembly or convertible top 12 which is foldable over a stationary structure 75 of the vehicle 10. The latching mechanism 20 of the present invention is adapted to releasably latch the foldable roof assembly 12 to the stationary structure 75 of the vehicle 10.

Although, the convertible top assembly, per se, does not form a part of the present invention, one skilled in the art will recognize that a convertible top assembly generally includes side support members connected by a series of bows, the forwardmost bow being referred to as the header bow 14, and the support structure being covered by a fabric top.

The foldable roof assembly 12 is attachable to a windshield header 16 located at the top of a windshield of the vehicle 10. The latching mechanism 20 of the present invention comprises two major portions; first, at least one pin member 18 which attaches to the convertible top 12, and secondly, a keeper assembly 9, which attaches to the stationary structure 75 of the vehicle 10, for retentively and disengagably receiving the pin member therein. In the embodiment of FIGS. 1-4, the keeper assembly 9 is mounted to a windshield header 16 of the vehicle 10. The mechanism 20 may include a second pin member (not shown) which is substantially identical to the first pin member 18.

Figure 4:
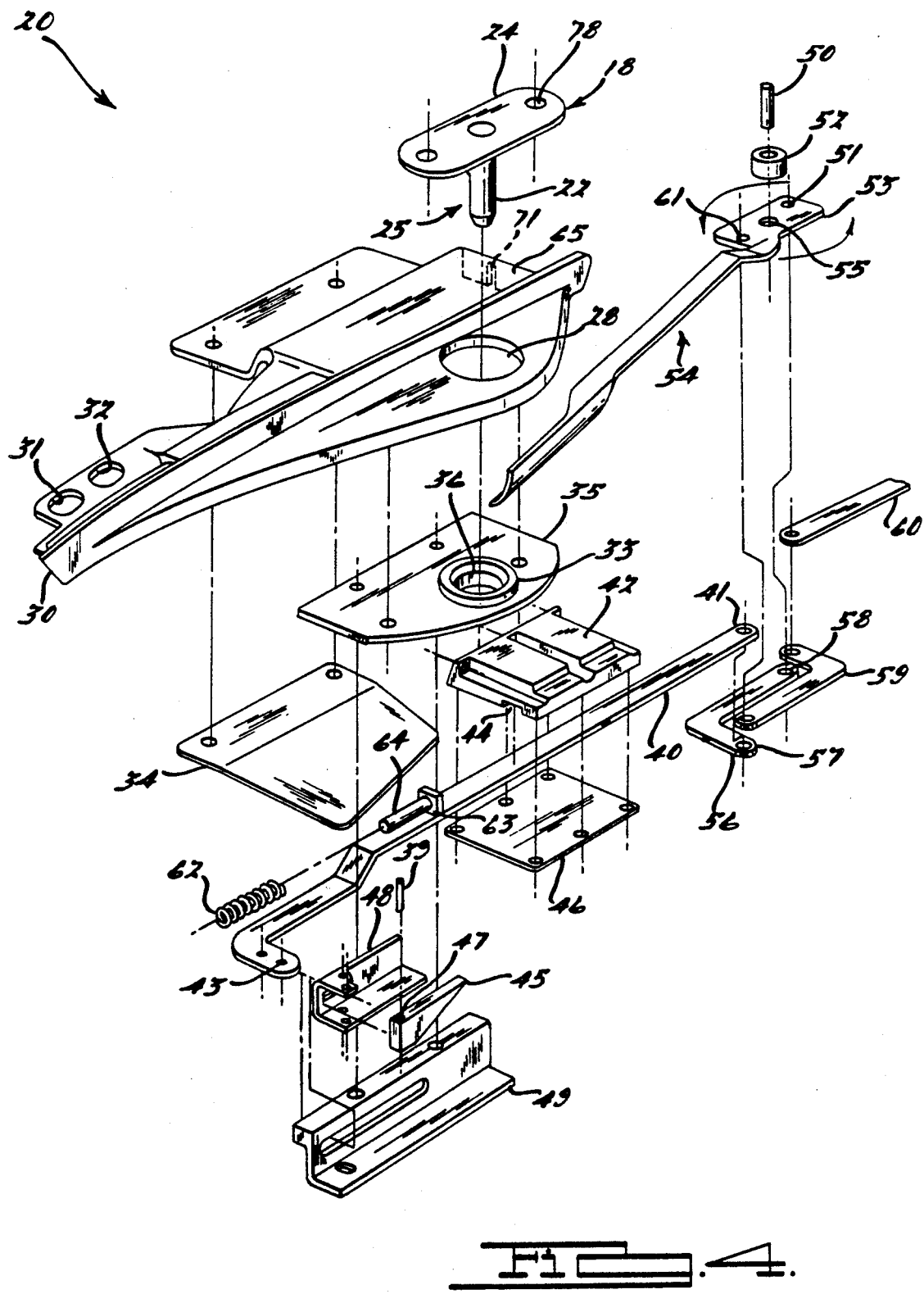
FIG. 4 is an exploded, perspective view of the handle and part of the latching mechanism of FIG. 1.

Referring to FIGS. 3 and 4, the first pin member 18 includes a latch pin 22 fixedly attached to a substantially planar base 24 by welding or the like. The first pin member 18 is mountable on a header bow 14 of a foldable roof assembly 12, and FIG. 3 shows a pin member which is so mounted. In one embodiment, the latch pin 22 and base 24 may be integrally formed as a unit. The base 24 may have holes 78 formed therethrough as shown in FIG. 4 for mounting the pin member 18 to a header bow 14 or other movable section of a vehicle 10. Attachment of the pin member 18 to the header bow 14 is accomplished using threaded fasteners (not shown) or any other suitable means, such as bonding or the like.

The latch pin 22 has a cutaway section 25 formed substantially horizontally therein, to define a space for accommodating a retaining member 45 herein. A lip 26 extends outwardly from the latch pin 22 below the cutaway section 25 for releasably retaining a retaining member 45 in the cutaway section, as will be further described hereinafter. The latch pin 22 may be flat on the side thereof which contains the cutaway section 25 to accommodate a flattened portion of the retaining member 45. The keeper assembly 9 retentively and disengagably receives the latch pin 22 therein.

The individual components of the keeper assembly 9 which make up the left and right halves of the assembly 9 as shown in FIG. 1 are substantially identical, except for being mirror images of one another, and are virtually identical in most respects. It therefore suffices to show in FIG. 4 and to describe herein only the left or driver's side of the latch mechanism 20, it being understood that, in the embodiment of FIG. 1, a mirror image of each of the parts shown in FIG. 4, is in place on the right or passenger's side of the latching mechanism 20 except for the parts numbered 50, 52, 54, 56, 59 and 60 in FIG. 4. 50, 52 and 54 are central to the assembly and are not duplicated. 56 and 59 are corresponding pieces which are both shown, and 60 is the mirror-image part which corresponds to 40.

The keeper assembly 9 includes a support plate 30 which has mounting holes 31, 32 formed therethrough for mounting the plate 30 to the windshield header 16 or other stationary portion of a vehicle 10. A reinforcing plate 34 attaches to lower surface of the support plate 30 by appropriate fasteners (not shown), e.g., rivets, nuts and bolts, or the like, and serves to clamp a first receiving plate 35 between the support plate 30 and the reinforcing plate 34. The first receiving plate 35 has a raised collar 33 formed thereon with a hole 36 formed axially in the raised collar 33 and through the plate 35 for receiving and guiding the latch pin 22 therethrough. The first support plate 30 has a hole 28 formed therethrough which recieves the raised collar 33 of the first receiving plate 35 therein and serves to orient the receiving plate 35 with respect to the support plate 30.

The keeper assembly 9 further includes a first transfer arm 40 which is held and supported in a rectangular arm guide 42 having a longitudinal slot 44 formed in the lower surface thereof. The longitudinal slot 44 receives the first transfer arm 40 therein. The arm guide 42 acts in cooperation with an arm guide plate 46 which attaches thereto by appropriate fasteners such as screws (not shown) or the like. The arm guide 42 and the arm guide plate 46 thus support the first transfer arm 40 for slidable movement thereof in the keeper assembly 9. The first transfer arm 40 is disposed below the receiving plate 35 and is slidably movable with respect thereto.

A first retaining member 45 is operatively connected to one end of the first transfer arm 40, such as, e.g., by an appropriate fastener 39 such as a roll pin or the like. The fastener 39 passes through a hole 43 in the end of the transfer arm 40, and the fastener 39 also passes through a hole 47 formed through the first retaining member 45, thereby fixedly attaching the first retaining member 45 to the first transfer arm 40.

The first retaining member 45 is disposed below the first receiving plate 35 and is adapted to fit in the cutaway section 25 of the latch pin 22 to disengagably retain the latch pin 22 in engagement with the retaining member 45. The latch pin 22 has the cutaway section 25 formed therein so that a member such as the first retaining member 45 may engagingly fit therein, and the lip 26 of the latch pin 22 serves to retain the pin 22 in the keeper assembly 9 while the retaining member 45 is disposed in the cutaway section 25 of the pin 22.

Additional structural pieces to support and guide the first transfer arm 40 with the first retaining member 45 thereon may optionally be provided, such as the cross-sectionally C-shaped bracket 48 and the cross-sectionally Z-shaped bracket 49 illustrated in FIG. 4, but these components are optional.

The keeper assembly 9 of the present invention also includes a pivot pin 50 which is attachable to a stationary section 75 of a vehicle such as the windshield header 16 in a convertible-type vehicle. In FIGS. 1 and 4, the pivot pin 50 is disposed in the center of the swivel plate 53 as will be further described herein. A pivot bushing 52, as shown in FIG. 4, may be disposed around the pivot pin 50 but is not required.

A handle 54 mounts on the pivot pin 50 such as, e.g., by installation of the pivot pin 50 in a hole 55 formed through a swivel plate 53 which is integrally formed as part of the handle 54. The handle 54 is mounted on the pivot pin 50 so as to be pivotally rotatable thereon. The handle 54 is also operatively connected to the first transfer arm 40 such as, e.g., by a first actuator link 56 interposed between the handle 54 and the transfer arm. In the embodiment shown in FIG. 4, the actuator link 56 is pivotally mounted at each end thereof; it is attached to the first transfer arm 40 at a hole 41 formed at an end of the transfer arm by a suitable fastener (not shown) such as a rivet or bolt which also passes through a hole 57 formed in an end of the L-shaped actuator link 56. The opposite end of the actuator link 56 has another hole 58 formed therein in which a suitable fastener (not shown) such as a rivet or bolt fits and fastens the actuator link 56 to the handle 54 at a second hole 51 formed in the swivel plate 53 of the handle 54. Alternatively, (not shown) the transfer arm 40 may be directly pivotally connected to the handle 54.

In the embodiment of FIGS. 1 through 4, a third hole 61 is formed through the swivel plate 53, and a second actuator link 59 is attached thereto by appropriate fasteners (not shown). The second actuator link 59 is attached at its opposite end by appropriate fasteners (not shown) to a second transfer arm 60 which is operable to slidably move a second retaining member when the handle 54 is rotated to retentively engage or disengage a second retaining member in a second pin member to retain the second pin member in a second receiving plate of the keeper assembly 9. The second pin member is located at the opposite side of the header bow 14 from the first pin member 18 and is substantially identical to the first pin member 18. Rotation of the handle 54 in this embodiment moves both transfer arms 40, 60 simultaneously.

The connection of the handle 54 to the transfer arm 40, whether an actuator link is used or not, enables slidable movement of the transfer arm 40 in a direction outwardly away from the pivot pin when the handle 54 is pivotally rotated about the pivot pin 50 in a counter clockwise direction as shown by the arrows in FIGS. 1 and 4. This slidable movement of the transfer arm 40 forces the retaining member 45 out of the cutaway section 25 in the first pin member 18 and disengages the retaining member 45 from engagement with the latch pin 22. This allows the foldable top assembly 12 to be moved upwardly as shown in FIG. 3, allowing the top assembly 12 to be disconnected from the windshield header 16 to permit the convertible top assembly 12 to be lowered. A different movable roof section, such as e.g., T-tops or a convertible hardtop, could be disconnected in a similar fashion.

Referring to FIG. 4, the keeper assembly 9 of the present invention also includes means for biasing the first transfer arm 40 towards the pivot pin 50, such as a spring 62 shown. A boss 63 is fixedly attached to the transfer arm 40 and extends upwardly and substantially normally therefrom. The attachment of the boss 63 to the transfer arm 40 may be by welding or the like. Extending outwardly from the boss 63 and substantially parallel to the transfer arm 40 is a spring retaining pin 64 for supporting and retaining the spring 62 thereon, on which the spring 62 is mounted. A spring resistance tab 65 is provided on the support plate 30 to provide resistance to the spring 62 while allowing the spring retaining pin 64 to pass through an opening 71 provided in the tab 65.

In this embodiment, the handle 54 is operatively connected to both the first and second transfer arms 40, 60 for simultaneous movement of the arms outwardly away from the pivot pin 50 when the handle 54 is pivotally rotated about the pin 50. Furthermore, in this embodiment, the first and second transfer arms 40, 60 are substantially diametrically opposed in their orientation relative to the handle 54.

It will be apparent from the foregoing description that the present invention is, also, suitable for use, generally, in latching a movable section of a vehicle to a stationary structure of the vehicle. The present invention may be used with automotive "T" tops and with the convertible hardtops which are now popular.

Having, thus, described the invention, what is claimed is:

1. In a convertible-type vehicle having a foldable convertible top with a header bow disposed in the convertible top, the vehicle also having a windshield with a windshield header attached thereto, an apparatus for latching the header bow to the windshield header, the improvement comprising:
    (a) a latch pin fixedly attached to the header bow and depending therefrom, the latch pin having a cutaway section and a lip extending outwardly therefrom below the cutaway section; and
    (b) a keeper assembly mounted to the windshield header which retentively and disengagably receives the latch pin, the keeper assembly comprising:
        (1) a receiving plate having a hole therethrough which receives the latch pin;
        (2) a transfer arm supported for slidable movement with respect to the receiving plate;
        (3) a retaining member operatively connected to the transfer arm and which passes below the receiving plate, the retaining member dimensioned to fit in the cutaway section of the latch pin to disengagably retain the latch pin in engagement therewith, the retaining member also moving linearly parallel to an axis defined by the transfer arm when engaging and disengaging the latch pin;
        (4) a pivot pin fixedly attached to the windshield header; and
        (5) a handle pivotally mounted on the pivot pin and which is operatively connected to the transfer arm for slidably moving the transfer arm outwardly in the windshield header substantially along an axis defined by the transfer arm when the handle is pivotally rotated about the pivot pin to disengage the retaining member from the latch pin.

2. A latching mechanism for use with a vehicle having a movable section mountable to a stationary structure of the vehicle, for releasably latching the movable section to the stationary structure of the vehicle, the latching mechanism comprising:
    (a) a first pin member comprising a latch pin having a cutaway section formed therein and with a lip extending outwardly below the cutaway section, the first pin member being mountable on a movable section of the vehicle; and
    (b) a keeper assembly for mounting on a stationary part of a vehicle to retentatively and disengagably receive the latch pin, the keeper assembly comprising:
        (1) a first receiving plate having a hole therethrough which receives the latch pin;
        (2) a first transfer arm mounted adjacent the first receiving plate and supported for slidable linear movement with respect to the first receiving plate, said linear movement being along an axis defined by the transfer arm;
        (3) a first retaining member disposed beneath the first receiving plate and operatively connected to the first transfer arm, the first retaining member moving linearly parallel to an axis defined by the transfer arm to engage the cutaway section of the latch pin to releasably retain the latch pin in engagement therewith;

(4) a pivot pin attachable to a stationary section of a vehicle; and (5) a handle which is pivotally rotatable on the pivot pin, the handle being operatively connected to the first transfer arm for causing slidable movement of the transfer arm substantially along an axis defined by the transfer arm when the handle is pivotally rotated about the pivot pin.

3. The latching mechanism of claim 2, wherein the handle comprises:

a swivel plate formed proximate an end thereof, the swivel plate having a first hole formed therethrough to receive the pivot pin, the swivel plate having a second hole formed therethrough for pivotal attachment of the swivel plate to an actuator link, the actuator link attached at an end thereof opposite the swivel plate to the transfer arm.

4. The latching mechanism of claim 2, further comprising: a second pin member mountable to the movable roof section, a second receiving plate for receiving the second pin member, a second transfer arm operatively connected to the handle, and a second retaining member engagable with the second pin member, the handle being operatively connected to both the first and second transfer arms for simultaneous movement thereof outwardly from the pivot pin.

5. The mechanism of claim 2, further comprising: means for biasing the first transfer arm toward the first pin member.

6. The latching mechanism of claim 2 further comprising a guide, said guide positioning and guiding the first transfer arm along the axis defined by the first transfer arm and positioned intermediate the first retaining member and the handle.

7. The latching mechanism of claim 2 wherein said handle is positioned substantially parallel and adjacent to a substantial length of the first transfer arm.

8. The latching mechanism of claim 3 wherein the actuator link is L-shaped wherein the long leg of the L-shaped link is pivotally attached to the swivel plate and the short leg of the L-shaped link is rigidly attached to the first transfer arm.

9. The latching mechanism as claimed in claim 2 wherein said first transfer arm has a longitudinal axis and said transfer arm slideably moves linearly along said longitudinal axis.

10. The latching mechanism as claimed in claim 2 wherein said retaining member is fixedly attached to said transfer arm.

11. The latching mechanism as claimed in claim 2 further comprising an actuator link having a first end pivotally connected to said handle and a second end pivotally connected to said first transfer arm.

12. The latching mechanism as claimed in claim 11 wherein said actuator link is L-shaped.

* * * * *